(No Model.)
J. A. BROWN.
SPROCKET CHAIN AND WHEEL.
No. 581,689. Patented May 4, 1897.
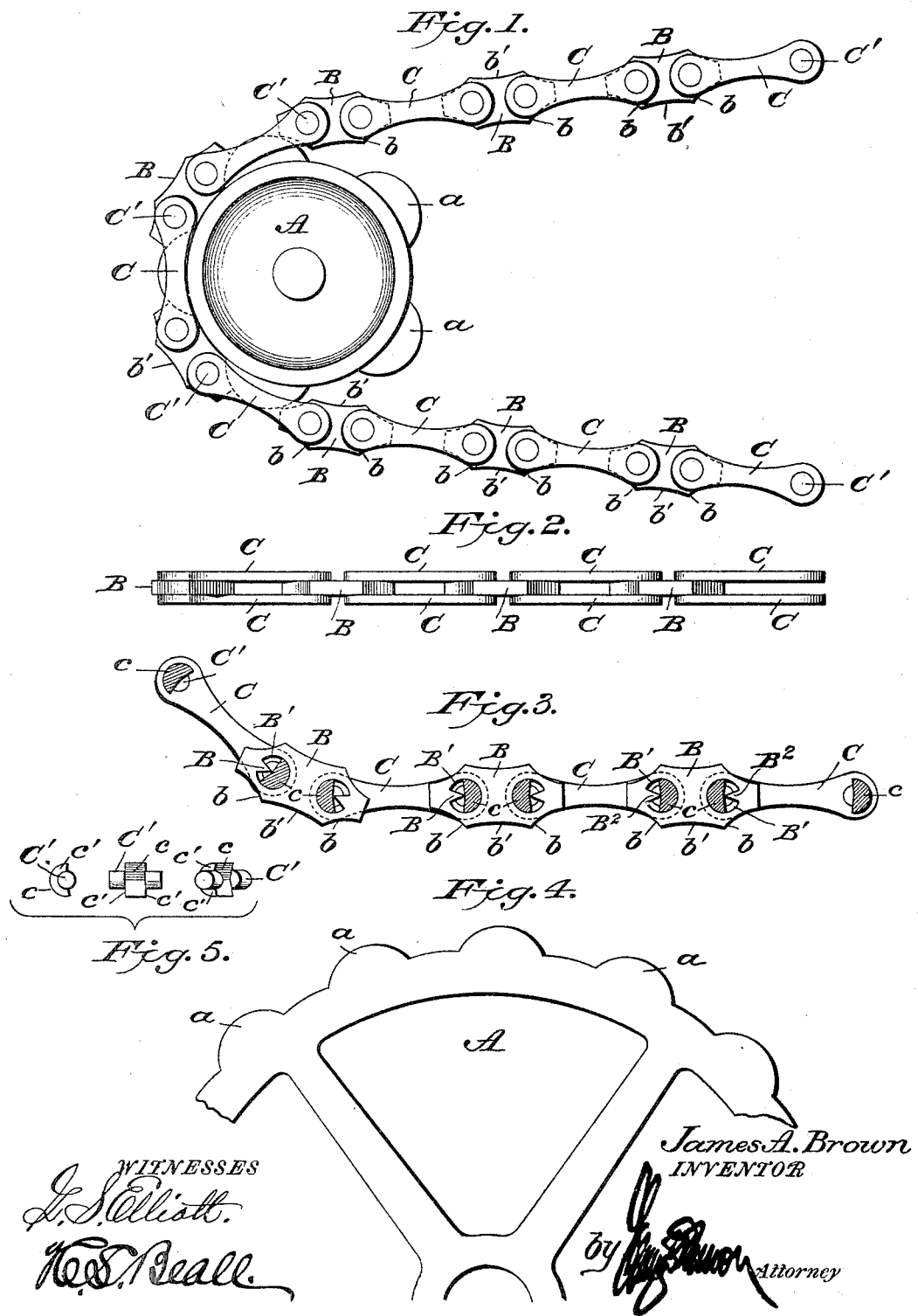
WITNESSES
J. S. Elliott.
K. S. Beall.
James A. Brown
INVENTOR
by [signature] Attorney

UNITED STATES PATENT OFFICE.

JAMES A. BROWN, OF CINCINNATI, OHIO, ASSIGNOR TO CHARLES O. HALL, OF SAME PLACE.

SPROCKET CHAIN AND WHEEL.

SPECIFICATION forming part of Letters Patent No. 581,689, dated May 4, 1897.

Application filed February 20, 1896. Serial No. 580,088. (No model.)

*To all whom it may concern:*

Be it known that I, JAMES A. BROWN, a citizen of the United States of America, residing at Cincinnati, in the county of Hamilton and State of Ohio, have invented certain new and useful Improvements in Sprocket Chains and Wheels; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in sprocket-gearing, and more particularly to the special construction of the chain and teeth of the sprocket-wheel, the object being to provide a sprocket-chain with center links having curved bearing-surfaces and the periphery of the wheel of such configuration that said bearing-surfaces will impinge against the same, the center links also having V-shaped projections which engage the pins that connect said center links to the side links, thus presenting knife-edge or antifriction bearing-surfaces, such construction being designed to provide a light-running and noiseless sprocket-gearing adapted for the propulsion of light machinery, as bicycles.

The invention consists in the construction and combination of the parts, as will be hereinafter fully set forth, and particularly pointed out in the claims.

In the accompanying drawings, forming part of this specification, Figure 1 is a side elevation of a sprocket wheel and chain constructed in accordance with my invention. Fig. 2 is a plan view of the chain. Fig. 3 is a longitudinal sectional view. Fig. 4 is a side elevation of the front or larger sprocket-wheel, and Fig. 5 detail views showing the pins or connections of the sprocket-chain which provide bearing-surfaces for the center links.

A designates the sprocket-wheels, which are provided with teeth $a$, projecting from the rim of the wheel in the form of segments to provide curved bearing-surfaces, and these curved bearing-surfaces may extend across the periphery of the wheel, as shown in Fig. 4 of the drawings, or may project centrally therefrom, so as to provide in use a peripheral margin on each side of the teeth, as in Fig. 1, with which the outer links of the chain may abut; and in practice the smaller sprocket-wheel will have bearing-rims or peripheral margins, while the larger or driving sprocket-wheel will have a narrow periphery, the teeth extending entirely across the periphery of the wheel.

B designates the center links of the chain, the end portions of which are curved, as shown at $b$, to correspond with the segmental teeth on the wheel A, and the side edges $b'$ of the center link are curved to correspond with the periphery of the wheel or that portion thereof between the segmental teeth.

In constructing sprocket-wheels for use with the chain it is considered essential that the links B should fit snugly upon the periphery of the wheel and against the segmental teeth thereof, and therefore the periphery of the larger sprocket-wheel should be made to correspond with the periphery of the smaller. In other words, the periphery of the larger sprocket-wheel between the segmental teeth instead of being a true circle should correspond with the bearing-surfaces $b'$ of the links B.

The links B are made up of flat pieces shaped to have the configuration hereinbefore described, and said plates are provided with apertures B', presenting V-shaped projections $B^2$, the point in one recess projecting toward the point in the other recess of the link. These links are connected to side links C C by means of transverse pins C', having centrally-enlarged portions $c$, which are concave on one side and convex on the other, as shown in Fig. 5, the ends of said enlarged portions presenting shoulders $c'$, against which the side links C bear, the ends of the pins being upset upon said links after the parts of the chain are placed together.

It will be noted that the width of the center portion $c$ of the links C' corresponds with the thickness of the center links B; also, that the pins are held in engagement with said links.

In a chain constructed as hereinbefore described there will be but little friction, as the direction of the strain will bring the bearings upon the point or knife-edges, so that a chain of this character will run freely and require but a small amount of lubrication.

In use the side links of the chain do not come in contact with the periphery of the larger or driving wheel A, but merely lie over the sides of the sprocket-teeth, the center links fitting between the sprocket-teeth and impinging against the same, and the curved edges of the links C are shaped so that the edges which engage with the rim or periphery of the smaller sprocket-wheel are of the same radius of curvature as the marginal projecting rims of said wheel; also, that the edge of the central links have a concave bearing-surface of the same radius of curvature as the peripheries of the sprocket-wheels, and the end concave bearing-surfaces having the same radius of curvature as the sprocket-teeth.

A chain and sprocket-wheel constructed as herein shown and described will run very easy, and there is but a small amount of wear upon the parts, and such wear, instead of having a deleterious effect upon the chain and wheel, improves them.

Having thus described my invention, what I claim as new, and desire to secure by Letters Patent, is—

1. In combination with the sprocket-wheels of different diameters, the smaller wheel having curved sprockets and marginal projecting rims, the larger wheel having sprockets and a periphery which is made up of said sprockets and alternate bearing surfaces or segments the curve of which has the same radius of curvature as the marginal rim of the smaller wheel; together with a chain having central links with curved bearing-surfaces which are adapted to contact with the sprockets and faces of the sprocket-wheels, and outer links the contacting edge of which has the same radius of curvature as the marginal projecting rims of the smaller sprocket-wheel, substantially as shown.

2. A sprocket-chain made up of a series of central links one of the sides of said links having edges shaped to present three concave bearing-surfaces, the central bearing-surface having the same radius of curvature as the peripheries of the sprocket-wheels, the end concave bearing-surfaces having the same radius of curvature as the sprockets; and outer links the contacting edges of which are shaped to correspond with the periphery of the smaller sprocket-wheel, substantially as shown and for the purpose set forth.

3. In combination with the sprocket-wheels having convex sprockets, of a chain having central links for engagement with said convex sprockets, the end portions of the links where they engage with the sprockets being concave, and an intermediate concave bearing edge, substantially as shown and for the purpose set forth.

4. A sprocket-chain made up of a series of central links and side links connected thereto, the central links having concave end bearing portions adapted to engage the periphery of the sprocket-teeth, and an intermediate concave bearing edge for engagement with the periphery of the sprocket-wheel between the teeth thereof substantially as shown and described.

In testimony whereof I affix my signature in presence of two witnesses.

JAMES A. BROWN.

Witnesses:
 JOHN C. ROGERS,
 W. E. BOYD.